United States Patent
Jilani

(10) Patent No.: US 9,397,929 B2
(45) Date of Patent: Jul. 19, 2016

(54) FORWARDING MULTICAST PACKETS OVER DIFFERENT LAYER-2 SEGMENTS

(71) Applicant: Ciena Corporation, Hanover, MD (US)

(72) Inventor: Jaffar Hameed Abdul Kather Jilani, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 383 days.

(21) Appl. No.: 13/867,568

(22) Filed: Apr. 22, 2013

(65) Prior Publication Data

US 2014/0314078 A1    Oct. 23, 2014

(51) Int. Cl.
*H04L 12/761* (2013.01)
*H04L 12/721* (2013.01)

(52) U.S. Cl.
CPC .............. *H04L 45/16* (2013.01); *H04L 45/66* (2013.01)

(58) Field of Classification Search
None
See application file for complete search history.

(56) References Cited

U.S. PATENT DOCUMENTS

| | | | |
|---|---|---|---|
| 5,740,171 A * | 4/1998 | Mazzola et al. | 370/392 |
| 7,590,120 B2 * | 9/2009 | Shuen et al. | 370/392 |
| 8,238,337 B1 * | 8/2012 | Orr et al. | 370/390 |
| 2003/0095554 A1 * | 5/2003 | Shimizu | H04L 45/502 370/395.53 |
| 2007/0104192 A1 * | 5/2007 | Yoon | H04L 12/4641 370/389 |
| 2010/0246580 A1 * | 9/2010 | Kaganoi et al. | 370/390 |
| 2011/0200042 A1 * | 8/2011 | Goli et al. | 370/390 |
| 2011/0228770 A1 * | 9/2011 | Dholakia et al. | 370/390 |
| 2012/0039334 A1 * | 2/2012 | Mehta et al. | 370/390 |
| 2014/0044129 A1 * | 2/2014 | Mentze et al. | 370/390 |

\* cited by examiner

*Primary Examiner* — Hassan Phillips
*Assistant Examiner* — Saba Tsegaye
(74) *Attorney, Agent, or Firm* — Clements Bernard PLLC; Christopher L. Bernard; Lawrence A. Baratta, Jr.

(57) ABSTRACT

Embodiments of the disclosure are directed to forwarding multicast packets among disparate Virtual Local Area Networks (VLANs). An embodiment receives a multicast packet matching registration criteria of one or more ports and forwards the multicast packet to the one or more ports, wherein the one or more ports are in a different VLAN than a port from which the multicast packet was received.

28 Claims, 7 Drawing Sheets

US 9,397,929 B2

FORWARDING MULTICAST PACKETS OVER DIFFERENT LAYER-2 SEGMENTS

BACKGROUND OF THE INVENTION

1. Field of the Invention

Embodiments of the disclosure are directed to forwarding multicast packets over different layer-2 segments.

2. Description of the Related Art

In computer networking, a single layer-2 (i.e. data link layer) network may be partitioned, or segmented, to create multiple distinct broadcast domains. Such a domain is referred to as a Virtual Local Area Network (VLAN). These broadcast domains are mutually isolated so that packets can only pass between them via one or more routers.

Currently, there is no mechanism to forward multicast packets over different VLANs. This is a disadvantage in cloud computing data centers, which are often designed as different layer-2 domains. As such, fault notifications from one data center will not be propagated to another since they are in different VLANs. However, applications running across different data centers should have the ability to know about fault notifications at other data centers. Currently, this must be done manually or by an automated mechanism at the application level.

Accordingly, there is a need for a mechanism to propagate multicast packets across multiple VLANs. Such a mechanism would save time over manual monitoring and would allow application programmers to write more efficient algorithms for fault notification across multiple data centers.

SUMMARY

Embodiments of the disclosure are directed to forwarding multicast packets among disparate Virtual Local Area Networks (VLANs). A method for forwarding multicast packets among disparate VLANs includes receiving a multicast packet matching registration criteria of one or more ports and forwarding the multicast packet to the one or more ports, wherein the one or more ports are in a different VLAN than a port from which the multicast packet was received.

An apparatus for forwarding multicast packets among disparate VLANs includes logic configured to receive a multicast packet matching registration criteria of one or more ports and logic configured to forward the multicast packet to the one or more ports, wherein the one or more ports are in a different VLAN than a port from which the multicast packet was received.

An apparatus for forwarding multicast packets among disparate VLANs includes means for receiving a multicast packet matching registration criteria of one or more ports and means for forwarding the multicast packet to the one or more ports, wherein the one or more ports are in a different VLAN than a port from which the multicast packet was received.

A non-transitory computer-readable medium for forwarding multicast packets among disparate VLANs includes at least one instruction to receive a multicast packet matching registration criteria of one or more ports and at least one instruction to forward the multicast packet to the one or more ports, wherein the one or more ports are in a different VLAN than a port from which the multicast packet was received.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
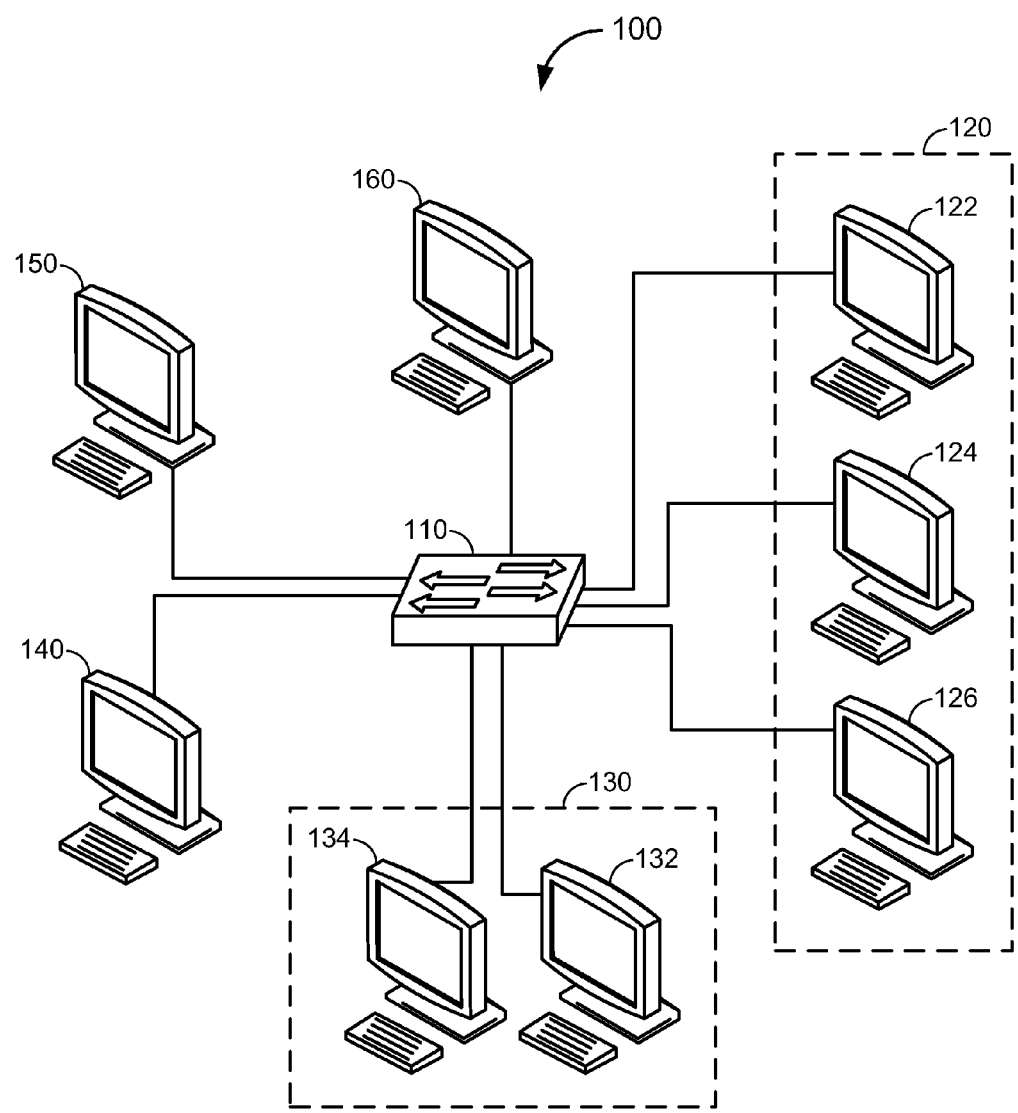
FIG. 1 illustrates an exemplary high-level system architecture of a layer-2 network partitioned into a plurality of VLANs.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Data communication networks may include various computers, servers, nodes, routers, switches, bridges, hubs, proxies, and other network devices coupled to and configured to pass data to one another. These devices are referred to herein as "network elements" or "network devices." Data is communicated through the data communication network by passing protocol data units, such as Internet Protocol (IP) packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

In computer networking, a single layer-2 (the data link layer) network may be partitioned, or segmented, to create multiple distinct broadcast domains. Such a domain is referred to as a Virtual Local Area Network (VLAN). These broadcast domains are mutually isolated so that data packets can only pass between them via one or more routers. As such, when a device in one VLAN transmits a multicast packet, it is only delivered to the other devices in that VLAN. It is not transmitted to any of the other devices connected to the same switch but that are not part of the originating VLAN.

FIG. 1 illustrates an exemplary high-level system architecture of a layer-2 network 100 partitioned into a plurality of VLANs. The network 100 may correspond to a data center, which is a facility housing computer systems and associated components, such as telecommunications and storage systems. The computer systems and associated components of a data center may communicate with each other over a wired and/or wireless network, such as an Ethernet network and/or a WiFi network. A cloud computing data center may include multiple physical data centers connected to each other over a wired and/or wireless network. In a cloud computing data center, an application may execute across multiple physical data centers.

In FIG. 1, the network 100 contains a switch 110, the ports of which are partitioned into VLANs 120, 130, 140, 150, and 160. The VLAN 120 includes computers 122, 124, and 126. The VLAN 130 includes computers 132 and 134. VLANs 140, 150, and 160 correspond to individual computers, and may be referred to interchangeably as computers 140, 150, and 160. The switch 110 may be a physical or virtual switch, and the connections between the switch 110 and the computers 122, 124, 126, 132, 134, 140, 150, and 160 may be wired or wireless.

Computers 122, 124, 126, 132, 134, 140, 150, and 160 can correspond to virtual machines or physical systems. A virtual machine is a simulation of an abstract or real world machine that typically differs from the target machine upon which it is being simulated. Where one or more of computers 122, 124, 126, 132, 134, 140, 150, and 160 correspond to physical systems, the physical computers 122, 124, 126, 132, 134, 140, 150, and/or 160 may correspond to any type of wired or wireless physical computers, such as laptop computers, desktop computers, tablet computers, and so on.

Figure 2:
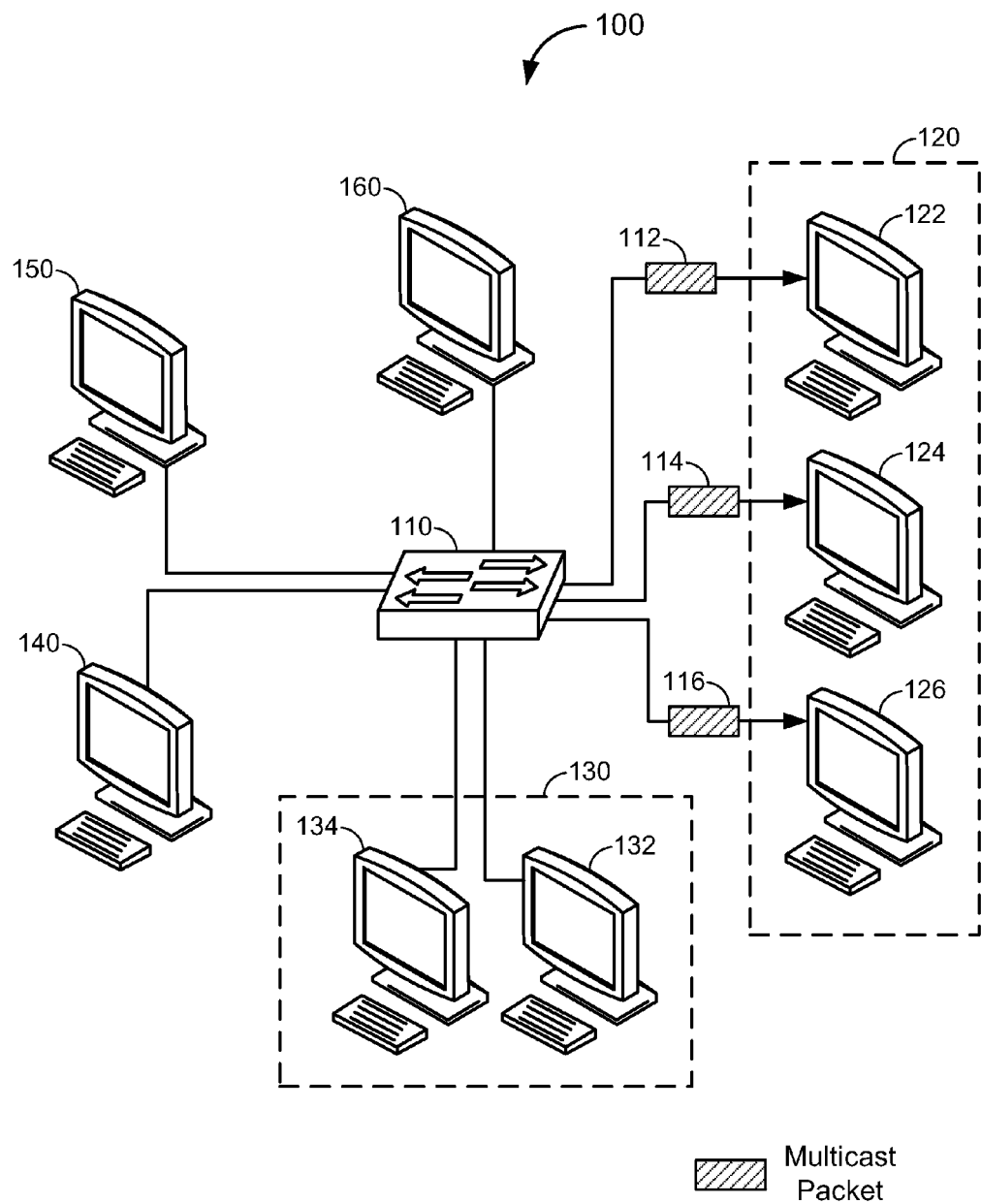
FIG. 2 illustrates exemplary multicast forwarding in the high-level system architecture of the network of FIG. 1.

FIG. 2 illustrates exemplary multicast forwarding in the high-level system architecture of the network 100 of FIG. 1. In the example of FIG. 2, the switch 110 transmits multicast packets 112, 114, and 116 to the computers 122, 124, and 126, respectively, in VLAN 120.

Currently, there is no mechanism to forward multicast packets among different VLANs connected to the same switch. This means that switch 110 only transmits multicast packets to the computers in the VLAN that includes the computer from which the packet was received, here VLAN 120. This is one of the main disadvantages of data centers. Most data centers are designed as different layer-2 domains, or VLANs, so multicast packets, such as fault notifications, from one data center cannot be automatically propagated to another data center since the data centers are in different VLANs. A data center administrator must manually monitor for such multicast packets and trigger the appropriate operations in applications running across both data centers. Thus, if the multicast packets illustrated in FIG. 1 should be propagated to one or more of VLANs 130, 140, 150, or 160, an administrator will have to manually propagate them at the application layer.

Figure 3:
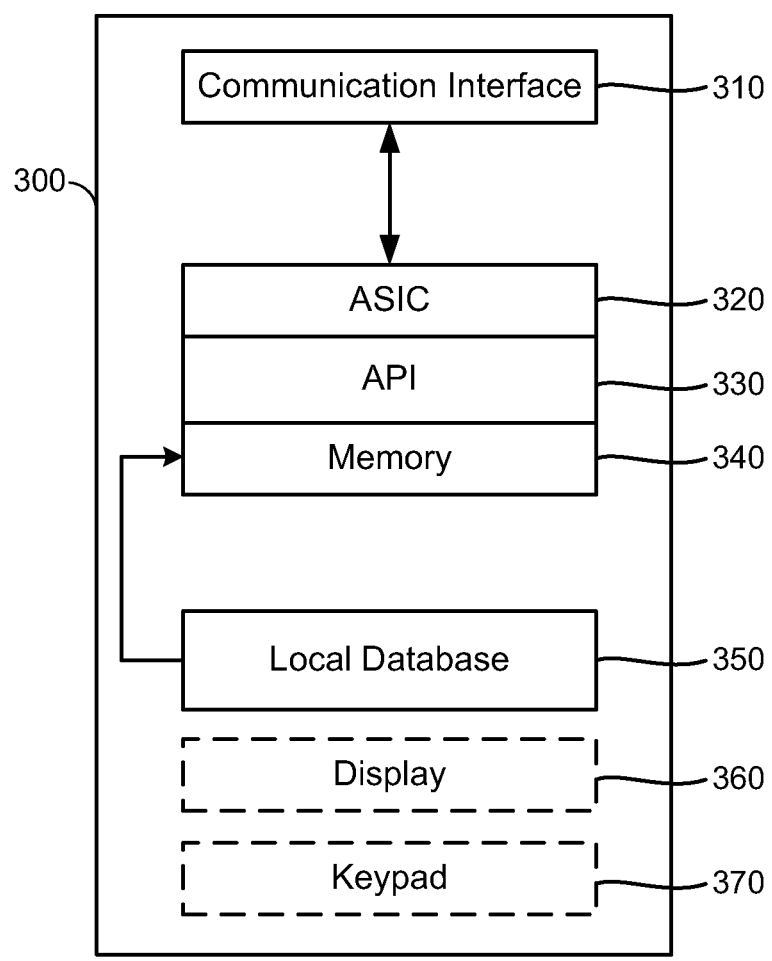
FIG. 3 illustrates an exemplary network element according to at least one aspect of the disclosure.

FIG. 3 illustrates an exemplary network element 300 according to at least one aspect. The network element 300 may be a desktop computer, a server, a node, a router, a switch, a bridge, a hub, a proxy, or any other network device coupled to and configured to receive data from or transmit data to one or more other network devices. For example, the network element 300 may correspond to switch 110.

While the internal components of the network element 300 can be embodied with different hardware configurations, an exemplary high-level configuration for various internal hardware components is shown in FIG. 3. The network element 300 can receive and execute software applications, data and/or commands received from a user, another network element, a remote server, etc. The network element 300 can also independently execute locally stored applications. The network element can include a communication interface 310 operably coupled to an application specific integrated circuit (ASIC) 320, or other processor, microprocessor, logic circuit, or other data processing device. The ASIC 320, or other processor, executes the application programming interface (API) 330 layer that interfaces with any resident programs in the memory 340 of the network element 300. The memory 340 can be comprised of read-only memory (ROM) or random-access memory (RAM), electrically erasable programmable ROM (EEPROM), flash cards, or any memory common to computer platforms. The network element 300 also can include a local database 350 that can store applications not actively used in memory 340, as well as other data. The local database 350 is typically a flash memory cell, but can be any secondary storage device as known in the art, such as magnetic media, EEPROM, optical media, tape, soft or hard disk, or the like.

Communication interface 310 may be any communication interface operable to receive and transmit data. For example, the communication interface 310 may be a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). The communication interface 310 may alternatively, or additionally, be a wired communications interface (e.g., a serial connection, a USB or Firewire connection, an Ethernet connection, etc.) and associated hardware. The communication interface 310 may alternatively, or additionally, be a user interface configured to receive input from a user. Accordingly, the communication interface 310 may be a wireless communication interface, a wired communication interface, and/or a user interface.

The network element 300 optionally includes a display 360 and a keypad 370. A user may use the display 360 and the keypad 370 to provide input to, or receive output from, the network element 300.

Accordingly, an aspect of the disclosure can include a network element, such as network element 300, including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 320, API 330, memory 340, and local database 350 may all be used cooperatively to load, store and execute the various functions disclosed herein and thus the logic to perform these functions may be distributed over various elements. Alternatively, the functionality could be incorporated into one discrete component. Therefore, the features of the network element 300 are to be considered merely illustrative, and the disclosure is not limited to the illustrated features or arrangement.

Figure 4:
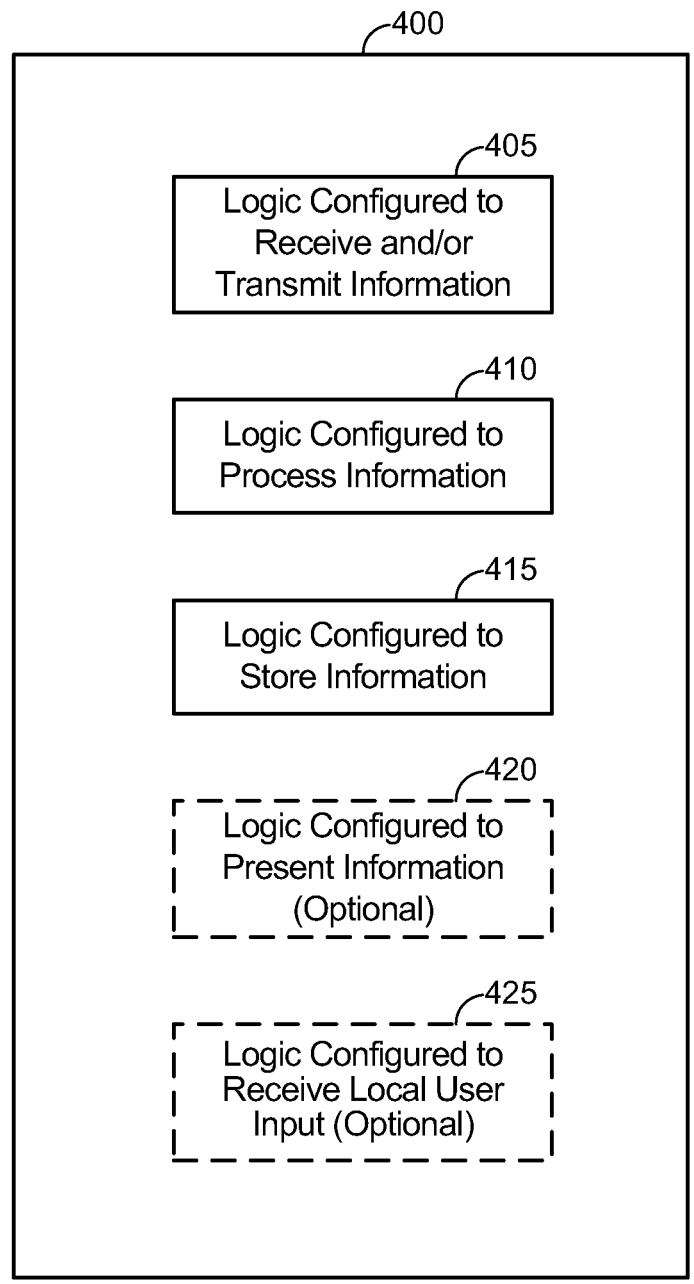
FIG. 4 illustrates a communication device that includes logic configured to perform functionality in accordance with an aspect of the disclosure.

FIG. 4 illustrates a communication device 400 that includes logic configured to perform functionality. The communication device 400 can correspond to any of the above-noted communication devices, such as network element 300, switch 110, and so on. Thus, communication device 400 can correspond to any electronic device that is configured to communicate with (or facilitate communication with) one or more other entities over a packet network.

Referring to FIG. 4, the communication device 400 includes logic configured to receive and/or transmit information 405. In an example, if the communication device 400 corresponds to a wireless communications device, the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection, etc.). Thus, if the communication device 400 corresponds to some type of network element, such as network element 300, the logic configured to receive and/or transmit information 405 can correspond to an Ethernet card, in an example, that connects the network element to other communication entities via an Ethernet protocol. The logic configured to receive and/or transmit information 405 can include logic configured to receive a multicast packet matching registration criteria of one or more ports and logic configured to forward the multicast packet to the one or more ports, wherein the one or more ports are in a different VLAN than a port from which the multicast packet was received. The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes, but is not limited to, performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM, flash memory, ROM, erasable programmable ROM (EPROM), EEPROM, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to the network element 300 as shown in FIG. 3, the logic configured to present information 420 can include the display 360 of network element 300. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to the network element 300 as shown in FIG. 3, the logic configured to receive local user input 425 can include the keypad 370. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

The disclosure provides a mechanism for forwarding multicast packets, such as fault notifications, across disparate VLANs at the data link layer (i.e. layer-2). The mechanism may be implemented at a switch, such as switch 110. Most data centers are designed as different layer-2 segments (or VLANs), but in cloud computing, an application may run across multiple data centers. The disclosed mechanism allows multicast packets to be propagated across different data centers even though they are separated as different VLANs.

The multicast forwarding mechanism forwards a particular multicast packet to a list of registered ports, even though the ports may belong to different VLANs. In order to receive the packet, each port or module must register for the multicast packet. A port requests a multicast packet by registering with the multicast forwarding mechanism.

More specifically, the mechanism waits for modules or ports to register themselves for particular multicast packets. The registration information includes criteria for the types of multicast packets that should be forwarded to the registered ports. When a multicast packet is received, it is compared to the registered criteria of each registered port. If the packet information matches the criteria for any of the registered ports, the packet is forwarded to that port, even if that port belongs to a different VLAN than the VLAN from which the packet originated. Any VLAN translation necessary can be performed before delivering the packet to the corresponding port, which prevents the requesting port from dropping the packet based on its VLAN classification. When a port or module removes its registration, any matching multicast packets will no longer be transmitted to that port.

The packet processing and forwarding can be handled in the hardware by using an access control list (ACL), for example. Further, while the mechanism can propagate the multicast packet across different VLANs, it only delivers the packet to the ports within a given VLAN that requested the packet.

Figure 5:
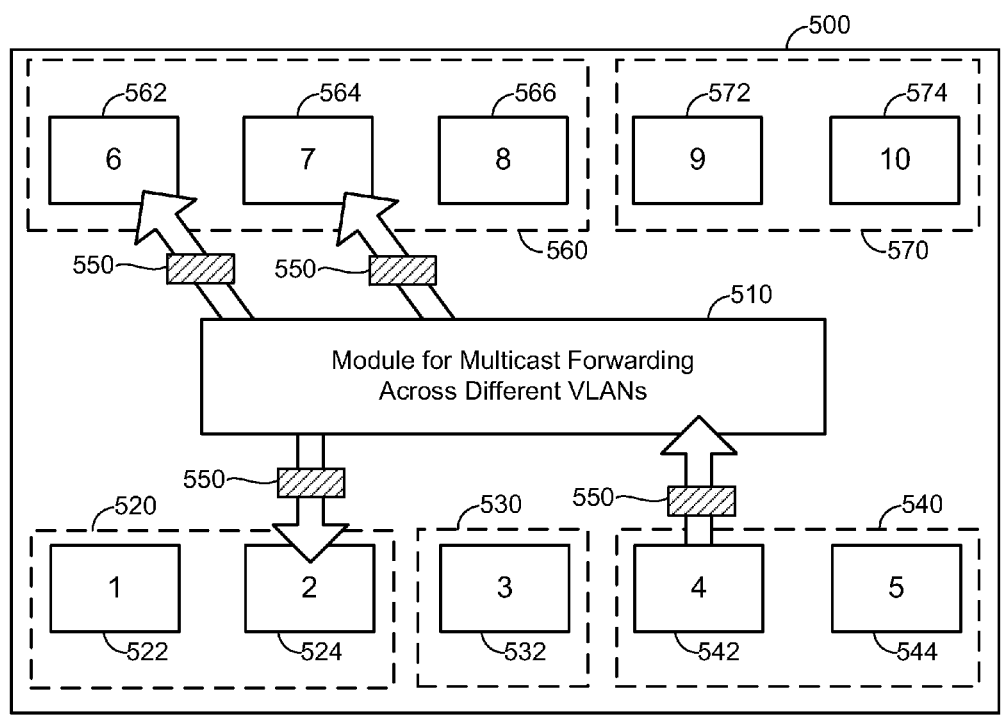
FIG. 5 illustrates an exemplary switch that includes a module for multicast forwarding across disparate VLANs.

FIG. 5 illustrates an exemplary switch 500 that includes a module for multicast packet forwarding across disparate VLANs 510. The module 510 may be a hardware, software, or hardware and software module executing in the switch 500. The switch 500 includes ports 522, 524, 532, 542, 544, 562, 564, 566, 572, and 574. Ports 522 and 524 correspond to a VLAN 520, port 532 corresponds to a VLAN 530, ports 542 and 544 correspond to a VLAN 540, ports 562-566 correspond to a VLAN 560, and ports 572 and 574 correspond to a VLAN 570.

When a multicast packet 550 is received on any port, such as port 542 in the example of FIG. 5, it can be processed in the regular packet processing plane in the hardware of switch 500. The multicast packet includes an identifier of the VLAN to which it belongs, here VLAN 540. By default, the packet is forwarded to the ports 542 and 544 corresponding to the identified VLAN 540.

In the example of FIG. 5, three ports 524, 562, and 564, belonging to VLAN's other than VLAN 540, are registered to receive multicast packets with parameters matching the parameters of multicast packet 550. Upon determining that the parameters of multicast packet 550 match the criteria registered by ports 524, 562, and 564, the module 510 makes a copy of the multicast packet 550 for each requesting port 524, 562, and 564 and uses one or more ACLs to translate the VLAN specified in the multicast packet 550 to the VLAN corresponding to each of the requesting ports 524, 562, and 564. The module 510 then forwards the copies of the multicast packet 550 to the matching ports 524, 562, and 564.

As illustrated in the example of FIG. 5, not every port of the VLANs that include the requesting ports 524, 562, and 564 receive a copy of the multicast packet 550. Rather, the multicast packet 550 is only forwarded to the specific ports that requested the multicast packet 550. For example, only ports 524, 562, and 564 in VLANs 520 and 560, respectively, receive packet 550. This reduces the amount of data the switch 500 must process.

When a port removes its registration (i.e. its request for the multicast packet), the corresponding entries in the ACL can be removed and multicast packets matching the previously registered criteria will not be delivered to those ports.

Figure 6:
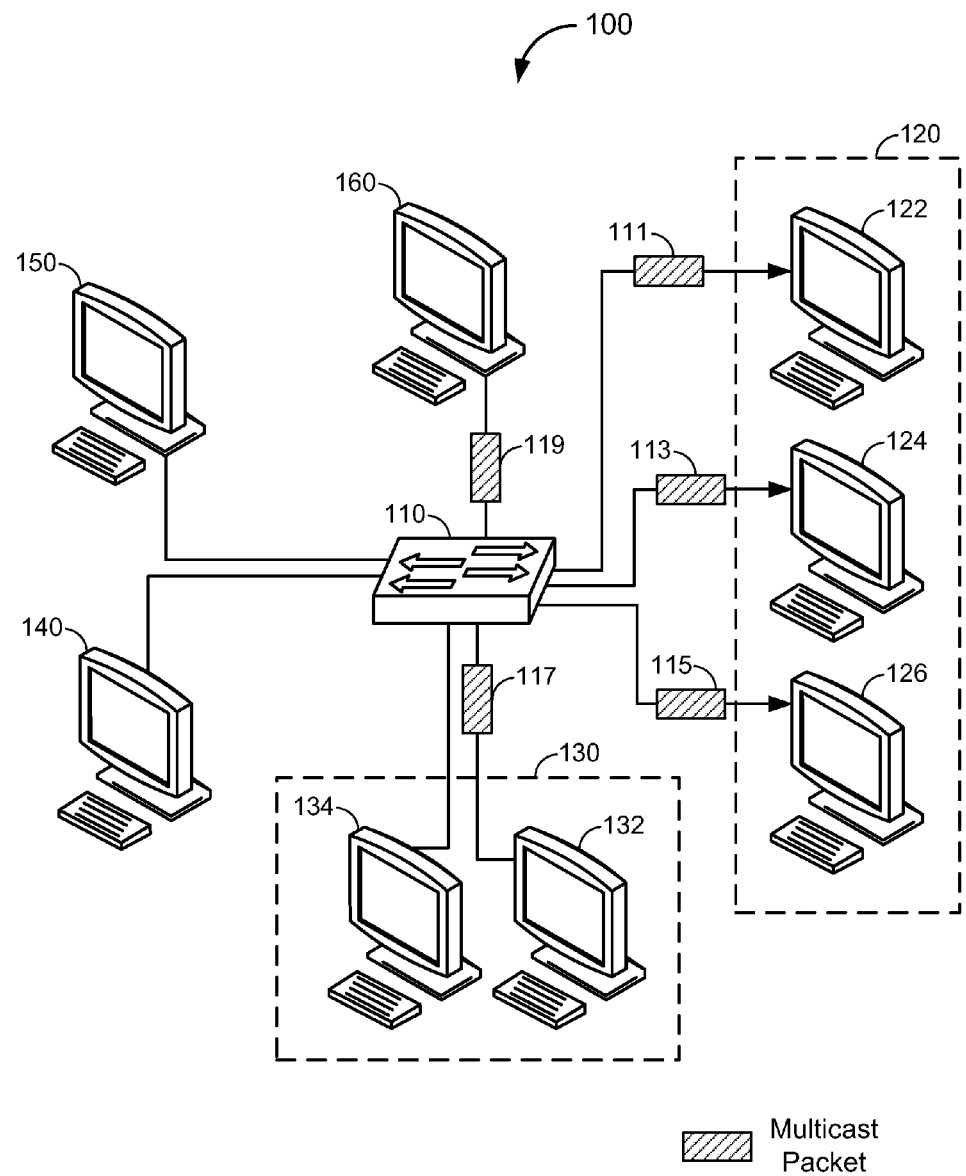
FIG. 6 illustrates exemplary multicast packet forwarding in the high-level system architecture of the network of FIG. 1 according to an aspect of the disclosure.

FIG. 6 illustrates exemplary multicast packet forwarding in the high-level system architecture of the network 100 of FIG.

1 according to an aspect of the disclosure. In the example of FIG. 6, the switch 110 transmits multicast packets 111, 113, 115, 117, and 119 to the computers 122, 124, 126, 132, and 160 respectively. In the example of FIG. 6, the multicast packet may have originated in VLAN 120, and thus, each computer 122, 124, and 126 in VLAN 120 receives a copy of the multicast packet (referred to as "flooding" the VLAN with the multicast packet). In contrast, only computer 132 in the VLAN 130 requested the multicast packet, even though VLAN 130 includes two computers 132 and 134. Accordingly, only computer 132 receives the multicast packet 117.

The forwarding mechanism can be extended to multiple switches by exchanging protocol data units (PDUs) and multicast membership information. The exchange mechanism can be generic and similar to the Generic Attribute Registration Protocol (GARP) Multicast Registration Protocol (GMRP). However, the exchange mechanism cannot use the GMRP exactly because it is limited to multicast forwarding within a single VLAN.

Figure 7:
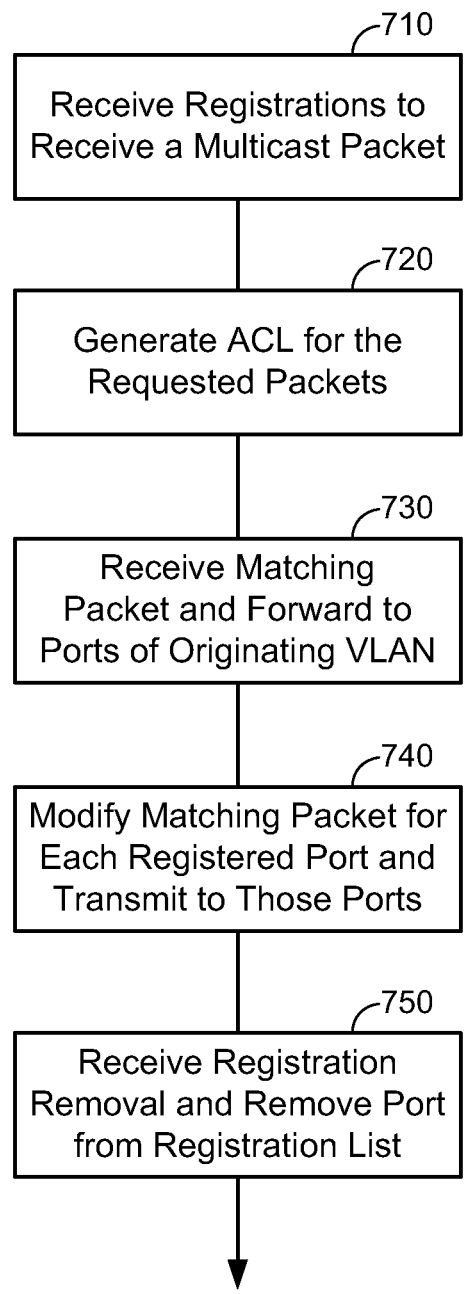
FIG. 7 illustrates an exemplary flow for forwarding multicast packets among disparate VLANs.

FIG. 7 illustrates an exemplary flow for forwarding multicast packets among disparate VLANs. At 710, a switch, such as switch 110 or switch 500, receives registrations for one or more ports across one or more disparate VLANs to receive multicast packets. The registration information includes criteria for the types of multicast packets that should be forwarded to the registered ports.

At 720, the switch generates an ACL (or modifies an existing ACL) for the parameters of a multicast packet that correspond to the criteria obtained from the registrations, such as, for example, VLAN, port number, multicast Media Access Control (MAC) address, etc.). That is, the registration information specifies certain criteria that the parameters of a multicast packet should match, and if the parameters of a received multicast packet match these registered criteria, the received multicast packet should be forwarded to the registered port.

At 730, the switch receives a multicast packet with parameter values that match the criteria specified in the registration information and generated ACL. The switch forwards the packet to each port in the VLAN that includes the port from which the multicast packet was received, as is done whether or not the parameters of a received packet match any of the registered criteria.

At 740, the switch makes copies of the received multicast packet for each registered port that registered criteria matching the parameters of the packet. The switch uses the ACL to replace the original VLAN specified in the received packet with the VLAN corresponding to the matching port(s). The switch then forwards the modified copy of the packet to each matching port(s).

At 750, the switch receives a request from one or more ports to de-register from the registration list. The switch removes the port from the registration list, and any further packets matching the previously registered criteria and ACL will not be forwarded to that port.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for forwarding multicast packets among disparate Virtual Local Area Networks (VLANs), comprising:
   receiving a multicast packet matching registration criteria of one or more ports; and
   forwarding the multicast packet to the one or more ports at layer-2 instead of at an application layer, wherein the one or more ports are in a different VLAN than a port from which the multicast packet was received, and wherein the forwarding is performed at layer-2 by generating a copy of the multicast packet for each of the one or more ports, and, for each copy of the multicast packet, replacing an identifier of a VLAN from which the multicast packet was received with an identifier of a VLAN corresponding to one of the one or more ports.

2. The method of claim 1, wherein the registration criteria comprise one or more values that match one or more parameters of the multicast packet.

3. The method of claim 2, wherein the parameters include one or more of a VLAN identifier, a port number, or a multicast Media Access Control (MAC) address.

4. The method of claim 1, further comprising:
   generating an access control list (ACL) based on the registration criteria, wherein the ACL includes an identifier of the VLAN corresponding to each of the one or more ports.

5. The method of claim 4, wherein the ACL is used to replace the identifier of the VLAN from which the multicast packet was received.

6. The method of claim 1, further comprising:
   receiving a registration request from each of the one or more ports, the registration request including the registration criteria; and
   adding the one or more ports to a list of registered ports.

7. The method of claim 6, further comprising:
   receiving a registration removal request from at least one of the one or more ports; and
   removing the port from the list of registered ports.

8. The method of claim 6, wherein the list of registered ports is stored at a network switch comprising the one or more ports.

9. The method of claim 1, wherein the multicast packet is a fault notification, wherein the receiving and the forwarding are performed at a network switch, and wherein the network switch includes each of the disparate VLANs.

10. An apparatus for forwarding multicast packets among disparate Virtual Local Area Networks (VLANs), comprising:
    logic configured to receive a multicast packet matching registration criteria of one or more ports; and
    logic configured to forward the multicast packet to the one or more ports at layer-2 instead of at an application layer, wherein the one or more ports are in a different VLAN than a port from which the multicast packet was received, and wherein the forwarding is performed at layer-2 by generating a copy of the multicast packet for each of the one or more ports, and, for each copy of the multicast packet, replacing an identifier of a VLAN from which the multicast packet was received with an identifier of a VLAN corresponding to one of the one or more ports.

11. The apparatus of claim 10, wherein the registration criteria comprise one or more values that match one or more parameters of the multicast packet.

12. The apparatus of claim 11, wherein the parameters include one or more of a VLAN identifier, a port number, or a multicast Media Access Control (MAC) address.

13. The apparatus of claim 10, further comprising:
    logic configured to generate an access control list (ACL) based on the registration criteria, wherein the ACL includes an identifier of the VLAN corresponding to each of the one or more ports.

14. The apparatus of claim 13, wherein the ACL is used to replace the identifier of the VLAN from which the multicast packet was received.

15. The apparatus of claim 10, further comprising:
    logic configured to receive a registration request from each of the one or more ports, the registration request including the registration criteria; and
    logic configured to add the one or more ports to a list of registered ports.

16. The apparatus of claim 15, further comprising:
    logic configured to receive a registration removal request from at least one of the one or more ports; and
    logic configured to remove the port from the list of registered ports.

17. The apparatus of claim 15, wherein the list of registered ports is stored at a network switch comprising the one or more ports.

18. The apparatus of claim 10, wherein the multicast packet is a fault notification, wherein the apparatus comprises a network switch, and wherein the network switch includes each of the disparate VLANs.

19. An apparatus for forwarding multicast packets among disparate Virtual Local Area Networks (VLANs), comprising:
    means for receiving a multicast packet matching registration criteria of one or more ports; and
    means for forwarding the multicast packet to the one or more ports at layer-2 instead of at an application layer, wherein the one or more ports are in a different VLAN than a port from which the multicast packet was received, and wherein the forwarding is performed at layer-2 by generating a copy of the multicast packet for each of the one or more ports, and, for each copy of the multicast packet, replacing an identifier of a VLAN from which the multicast packet was received with an identifier of a VLAN corresponding to one of the one or more ports.

20. The apparatus of claim 19, wherein the registration criteria comprise one or more values that match one or more parameters of the multicast packet.

21. The apparatus of claim 20, wherein the parameters include one or more of a VLAN identifier, a port number, or a multicast Media Access Control (MAC) address.

22. The apparatus of claim 19, further comprising:
    means for receiving a registration request from each of the one or more ports, the registration request including the registration criteria; and means for adding the one or more ports to a list of registered ports.

23. The apparatus of claim 22, further comprising:

means for receiving a registration removal request from at least one of the one or more ports; and means for removing the port from the list of registered ports.

24. A non-transitory computer-readable medium for forwarding multicast packets among disparate Virtual Local Area Networks (VLANs), comprising:

at least one instruction to receive a multicast packet matching registration criteria of one or more ports; and at least one instruction to forward the multicast packet to the one or more ports at layer-2 instead of at an application layer, wherein the one or more ports are in a different VLAN than a port from which the multicast packet was received, and wherein the forwarding is performed at layer-2 by generating a copy of the multicast packet for each of the one or more ports, and, for each copy of the multicast packet, replacing an identifier of a VLAN from which the multicast packet was received with an identifier of a VLAN corresponding to one of the one or more ports.

25. The non-transitory computer-readable medium of claim 24, wherein the registration criteria comprise one or more values that match one or more parameters of the multicast packet.

26. The non-transitory computer-readable medium of claim 25, wherein the parameters include one or more of a VLAN identifier, a port number, or a multicast Media Access Control (MAC) address.

27. The non-transitory computer-readable medium of claim 24, further comprising:

at least one instruction to receive a registration request from each of the one or more ports, the registration request including the registration criteria; and at least one instruction to add the one or more ports to a list of registered ports.

28. The non-transitory computer-readable medium of claim 27, further comprising:

at least one instruction to receive a registration removal request from at least one of the one or more ports; and at least one instruction to remove the port from the list of registered ports.

* * * * *